United States Patent [19]

Smiley

[11] 4,231,287
[45] Nov. 4, 1980

[54] SPRING DIAPHRAGM
[75] Inventor: Parker C. Smiley, Oakland, Calif.
[73] Assignee: Physics International Company, San Leandro, Calif.
[21] Appl. No.: 901,622
[22] Filed: May 1, 1978
[51] Int. Cl.³ .......................... F01B 19/00; F16J 3/00
[52] U.S. Cl. ...................................... 92/94; 92/98 R; 417/322; 417/413
[58] Field of Search ................ 92/103 R, 103 M, 105, 92/89, 90, 104, 94, 98 R; 417/322, 413

[56] References Cited
U.S. PATENT DOCUMENTS

| | | | |
|---|---|---|---|
| 1,489,349 | 4/1924 | Hampton | 92/103 R |
| 1,714,573 | 5/1929 | Sloan | 92/103 R |
| 2,307,066 | 1/1943 | Paulus | 92/103 R |
| 2,565,847 | 8/1951 | Hilgert | 92/103 M |
| 2,747,615 | 5/1956 | Tate | 92/103 M |
| 2,842,067 | 7/1958 | Stevens | 417/322 |
| 3,011,758 | 12/1961 | McFarland, Jr. | 92/104 |
| 3,022,039 | 2/1962 | Cone | |
| 3,079,953 | 3/1963 | Mounteer | 92/104 |
| 3,228,248 | 1/1966 | Li | 92/104 |
| 3,749,354 | 7/1973 | Raitport | |

FOREIGN PATENT DOCUMENTS 51527 10/1941 Netherlands ................... 417/322

Primary Examiner—Abraham Hershkovitz
Attorney, Agent, or Firm—Robert R. Tipton

[57] ABSTRACT

A high pressure diaphragm for use with an electroexpansive material utilizes a generally planar central member, a generally outer flange-engaging member, and an annular ring member, which can have a frusto-conical shape, having its outer edge flexibly connected to the inner edge of the flange-engaging member and with its inner edge flexibly connected to the outer edge of the central member. The flexible connection includes a bridge member having a thickness less than the thickness of the annular ring member and maybe fabricated integrally with said annular ring member and with the central and flange-engaging members. In one embodiment the high pressure diaphgram is pre-loaded so that during movement no portion of the flexible connectors are in tension.

12 Claims, 14 Drawing Figures

SPRING DIAPHRAGM

BACKGROUND OF THE INVENTION

This invention relates generally to diaphragms for fluid pumps and in particular to high pressure fluid pump diaphragms.

High pressure pump diaphragms of the prior art have generally been fabricated from a thin disk of beryllium copper or stainless steel having a bellows type configuration about the outer periphery to allow for displacement movement of the diaphragm. The resilient characteristics of a belleville spring washer are used to create the restoring force for the electroexpansive member. It has been found, however, that for high flexure cycles, beryllium copper tends to fatigue and results in sudden breakdown. Where an electroexpansive material, such as a piezoelectric material, is used to drive a pump diaphragm it is necessary to provide a strong and low inertia restoring force to the piezoelectric material in order to achieve fast reaction time for the controlled pumping of a fluid.

The prior art devices utilizing a piezoelectric material have, at times employed a bellville spring in conjunction with a beryllium copper diaphragm which offers limited reliability because of the fatigue failure of the beryllium copper.

Other techniques for transmitting energy from the piezoelectric stack to a pump fluid include hydraulic piston arrangements in place of the beryllium copper diaphragm. As can be seen, such an arrangement, because of the mass of the piston, reduces the response time of the pumping cycle. Also, seal friction at high pump pressures reduces the force available from electroexpansive drives. In certain applications, such as, for example, a liquid chromatograph pump, the ability to flush the chamber when changing fluids is important. A smooth surface with no trapped fluid volumes is provided by the spring diaphragm of the present invention.

SUMMARY OF THE INVENTION

The high pressure diaphragm of the present invention provides greater reliability and utility in that it comprises a generally planar central member having an outer edge, a generally planar outer flange-engaging member having an inner edge and resilient annular ring member whose outer edge is flexibly connected to the inner edge of said flange-engaging member and whose inner edge is flexibly connected to the outer edge of the central member. The flexible connectors include a bridge member having a thickness less than the thickness of the annular ring resilient member. The entire combination, including the bridge members, can be fabricated integrally with said flange-engaging member, annular ring member and central member.

The flexible connector also includes the use of a ductile material selected from the group consisting of lead, tin, copper aluminum or zinc and disposed between the edges of the annular ring member, the central member and the flange-engaging member. The annular ring member can define a frusto-conical shaped ring member.

The entire high pressure diaphragm member is preloaded by a force sufficient to maintain the flexible connector members in compression during their flexure.

It is, therefore, an object of the present invention to provide a high pressure diaphragm for a fluid pump having a long life and greater reliability.

It is a further object of the present invention to provide a high pressure diaphragm for a fluid pump which can provide a strong and low inertia restoring force to the electroexpansive actuator.

It is a further object of the present invention to provide a high pressure diaphragm for a fluid pump in which all flexing members are maintained in compression.

It is another object of the present invention to provide a high pressure diaphragm for a fluid pump which can be fabricated from a single piece of material varying in thickness at the points of flexure.

It is still another object of the present invention to provide a high pressure diaphragm for a pump in which a ductile material is utilized at the points of flexure.

It is another object of the present invention to provide a pumping chamber free from trapped volumes so that the pump may be easily and effectively cleaned for changing fluids.

These and other objects of the present invention will be manifest upon a study of the following detailed description when taken together with the drawings.

DESCRIPTION OF THE PREFERRED EMBODIMENTS

Figure 1:
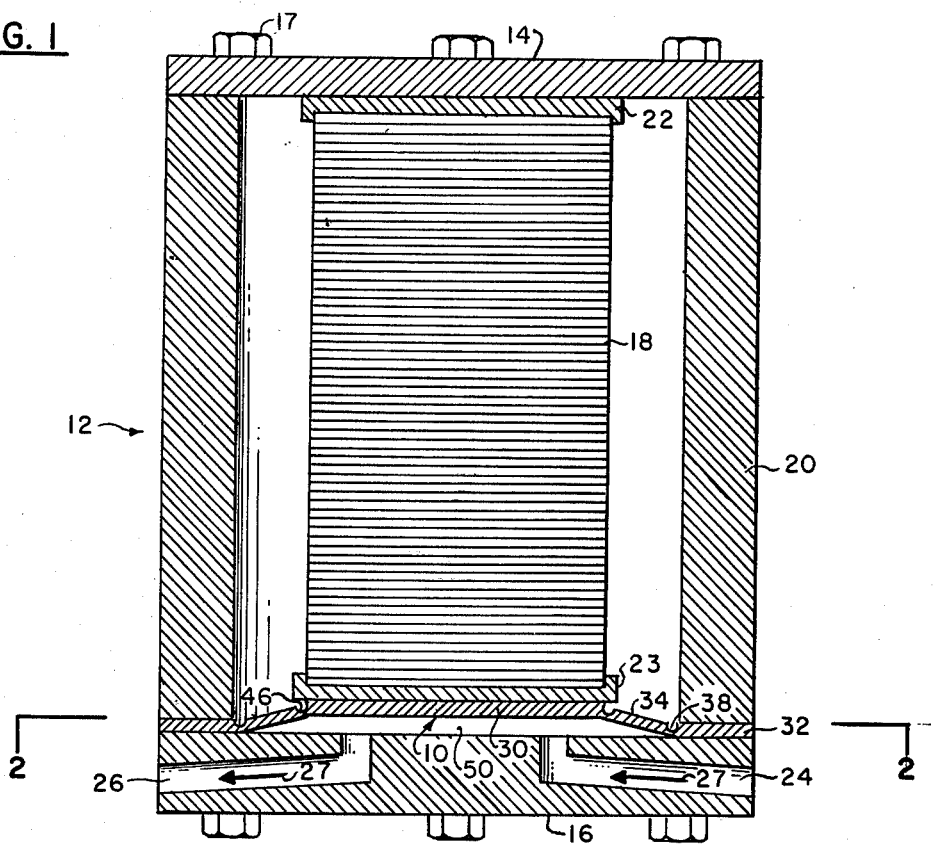
FIG. 1 is a cross-sectional, elevational view of a typical piezoelectric pump assembly utilizing the high pressure diaphragm of the present invention.

With reference to FIG. 1 there is illustrated an elevational cross-sectional view of the high pressure diaphragm 10 of the present invention as used in a high pressure electroexpansive pump 12.

High pressure pump 12 comprises, basically, a top support plate 14 and a bottom support plate 16 between which is sandwiched a stack of piezoelectric or electroexpansive disks 18 and high pressure diaphragm 10. Pump body section 20 maintains top support plate 14 and bottom support plate 16 in fixed spaced apart relationship and is held together by tie bolts 17.

The length of piezoelectric stack 18, including the thickness of top bearing plate 22, bottom bearing plate 23 and the thickness of high pressure diaphragm 10, is adjusted such that when stack 18 is in the contracted condition, a positive pressure can be maintained on diaphragm 10.

Bottom support plate 16 further comprises an inlet port 24 and an outlet 26 which are provided with valves (not shown) common in the art to permit fluid to enter and leave the pump as shown by arrows 27, as stack 18 is expanded and contracted forcing diaphragm 10 toward and away from bottom support plate 16. Methods for achieving expansion and contraction of electroexpansive materials is well known in the art and, therefore, is not shown in detail in this disclosure.

Figure 2:
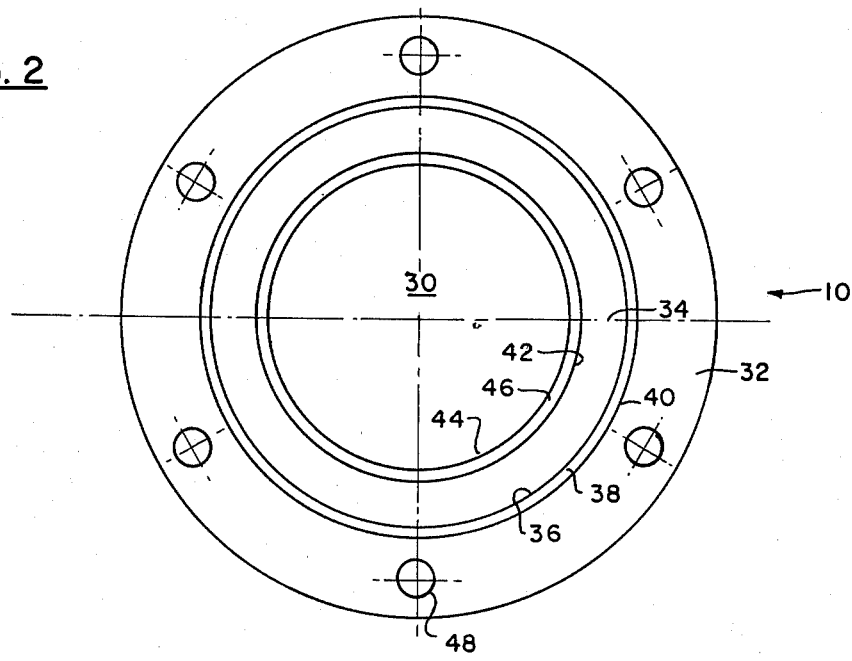
FIG. 2 is a top view of a typical high pressure diaphragm of the present invention.

With reference to both FIGS. 1 and 2 it will be noted that high pressure diaphragm 10 comprises a generally planar central member 30, a generally planar outer flange-engaging member 32 and an annular ring member 34 defined in FIGS. 1 and 2 as frusto-conical shaped having its outer edge 36 connected by flexible connector means 38 to inner edge 40 of flange-engaging member 32. The inner edge 42 of frusto-conical annular ring member 34 is connected to the outer edge 44 of central member 30 by flexible connector means 46.

A set of equally spaced holes 48 are provided in flange-engaging member 32 corresponding to similar holes in base support member 16 and pump body 20 which are adapted to receive tie bolts 17 in order to hold pump 12 together as a solid singular unit.

Again with reference to FIG. 1, when in position, diaphragm 10 defines a space or cavity 50 between bottom support plate 16 and central member 30 with frusto-conical or annular ring member 34 defining the outer peripheral edge of cavity 50.

Thus it can be seen as piezoelectric stack 18 expands and contracts, central member 30 is displace toward and away from bottom support plate 16 thus alternately decreasing and increasing the volume of cavity 50. It can also be seen that high pressure diaphragm 10 will always recover to exert an expanding pressure on stack 18 because of the resilience of the frusto-conical or annular ring member.

It can also be seen that if there is no compressive load on diaphragm 10 or connector means 38 and 46, any flexure on those connector means will produce tensile and compressive forces in the connector member as it bends back and forth.

Applicant has discovered that by preloading diaphragm 10 sufficiently to place connector means 38 and 46 always in compression, all tensile stresses created by flexing of the connector means are reduced to zero. It has been found that, plastic deformation of the connector means can be permitted without detrimentally affecting its integrity and ability to function, resulting in a substantial increase in life of the diaphragm. It has also been found that materials other than beryllium copper function well, for example, precipitation hardened stainless steel which has a higher resistance to corrosion than beryllium copper can be used.

With reference to FIGS. 3 through 10 there are illustrated a number of elevational partial cross-sections of various configuration of the high pressure diaphragm of the present invention.

Figure 3:
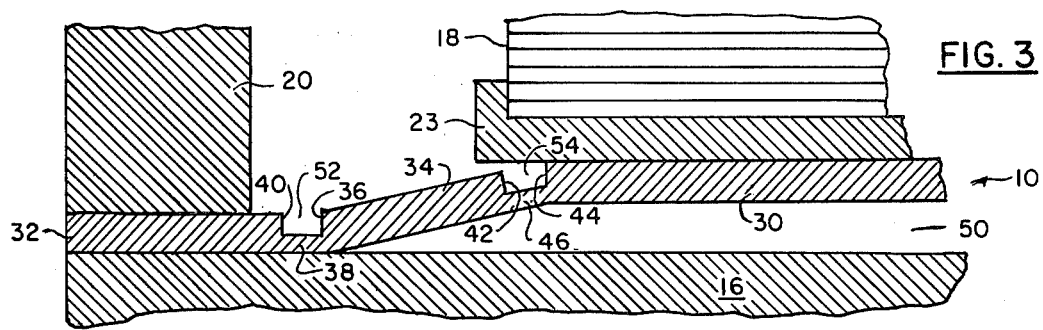
FIG. 3 is a cross-sectional, elevational view of the high pressure diaphragm of FIG. 2 taken at lines 3—3.

In FIG. 3, which is an enlarged cross-sectional view of the diaphragm shown in FIGS. 1 and 2, an upward facing outer groove 52 is provided between outer flange member 32 and frusto-conical or annular ring member 34 to define bridge or connector member 38, while an upward facing inner groove 54 is provided between central member 30 and frusto-conical or annular ring member 34 to define connector member 46. Both bridge or connector members 38 and 46 are thus integral with flange-engaging member 32, central member 30 and frusto-conical or annular ring member 34. Connector or bridge member 38 is located between inner edge 40 of flange member 32 and outer edge 36 of frusto-conical or annular ring member 34, while connector or bridge member 46 is located between outer edge 42 of frusto-conical or annular ring member 34 and inner edge 44 of central member 30.

Figure 4:
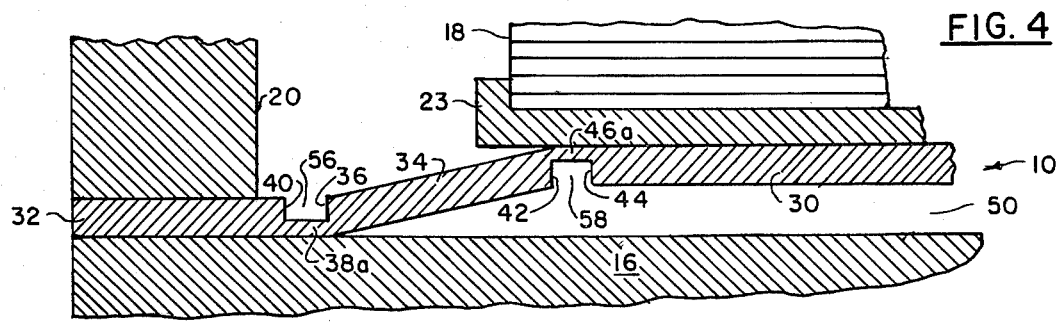
FIGS. 4-14, inclusive, are cross-sectional, elevational views of other configurations of the high pressure diaphragm of the present invention.

In FIG. 4 an upward facing groove 56 is provided between outer flange member 32 and frusto-conical or annular ring member 34 to define bridge or connector member 38a similar to FIG. 3, however, a downward facing groove 58 is provided between central member 30 and frusto-conical or annular ring member 34 to define bridge or connector member 46a which receives support from bottom bearing plate 23 of piezoelectric stack 18.

Figure 5:
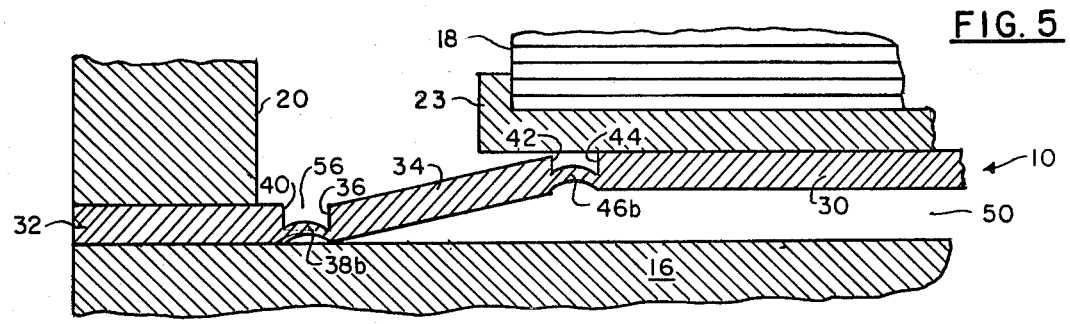

In FIG. 5 bridge or connector members 38b and 46b are curved to permit radial expansion and contraction of frusto-conical or annular member 34.

Figure 6:
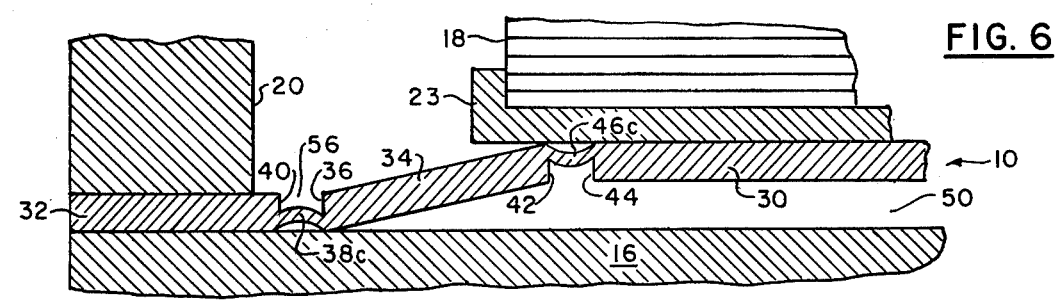

The same if true for FIG. 6, however, connector member 46c is disposed against the bottom surface of bottom bearing plate 23 of piezoelectric stack 18 to provide support above edge 42 of frusto-conical member 34.

Figure 7:
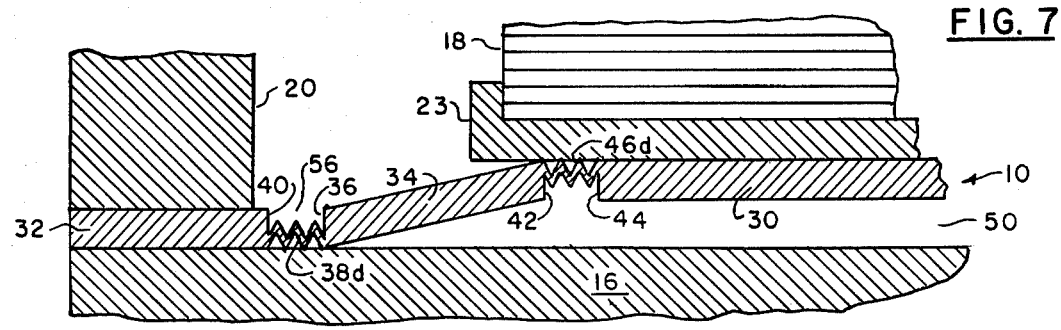

In FIG. 7 a circumferentially corrugated connector member 38d and 46d is used to provide for radial expansion and contraction of frusto-conical or annular ring member 34.

Figure 8:
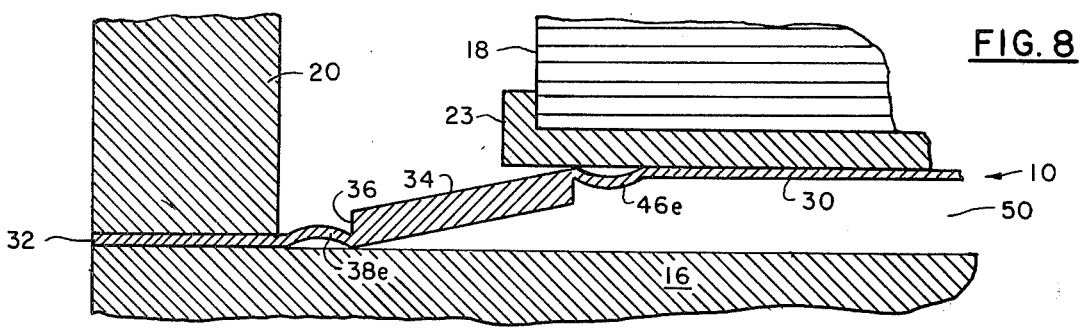

With reference to FIG. 8, since central member 30 is supported by bottom bearing plate 23 of piezoelectric stack 18 and outer flange engaging member 32 is supported tightly between pump body 20 and bottom support plate 16, they need not be of as heavy a thickness of material as frusto-conical member 34 but are provided with curved connector members 38e and 46e to allow for radial expansion and contraction of frusto-conical or annular ring member 34 as central member 30 is compressed toward and away from bottom support plate 16.

Figure 9:
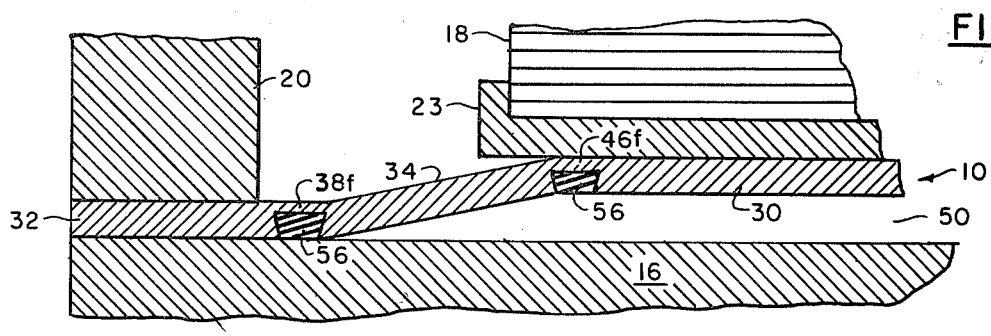

In FIG. 9 connector members 38f and 46f can be relatively thin with the grooves filled with a ductile material 58 such as lead, zinc, thin, copper, ductile aluminum, elastomer, or the like, to take up the internal hydraulic pressure and provide a smooth internal surface devoid of spaces or volumes capable of trapping pumped fluids. The restoring force for diaphragm 10 of the present invention comes from annular ring or frusto-conical member 34.

Figure 10:
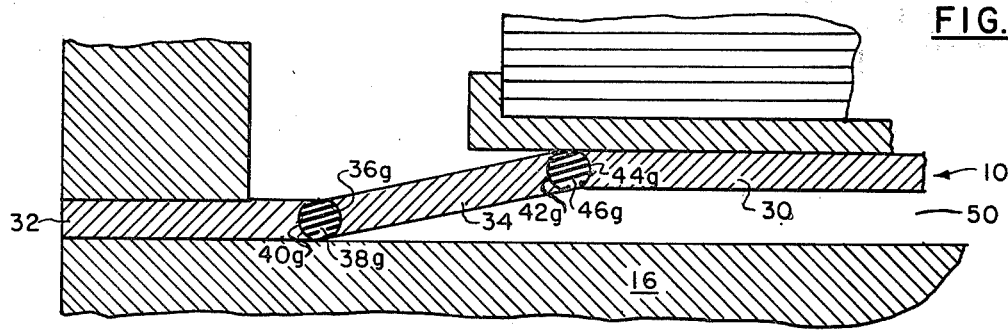

With reference to FIG. 10, no integral connector is shown, instead resilient or ductile connector members 38g and 46g are used, respectively, between outer flange-engaging member 32 and frusto-conical or annular ring member 34, and frusto-conical or annular ring member 34 and central member 30. Connector members 38g and 46g can comprise any ductile material such as lead, zinc, tin, copper, ductile aluminum or the like. By maintaining a preloading on diaphragm 10, connector members 38g and 46g can be maintained in compression at all times during rotational movement between members 30, 32 and 34. Thus while in compression, the material of connectors 38g and 46g is free to move but not separate as it would if it were under tension.

It will also be noted that the edges 42g and 44g on each side of ductile connector member 46g as well as edges 40g and 36g on each side of ductile connector member 38g are shaped to retain connectors 38g and 46g in a locked arrangement when properly positioned in pump 12.

Figure 11:
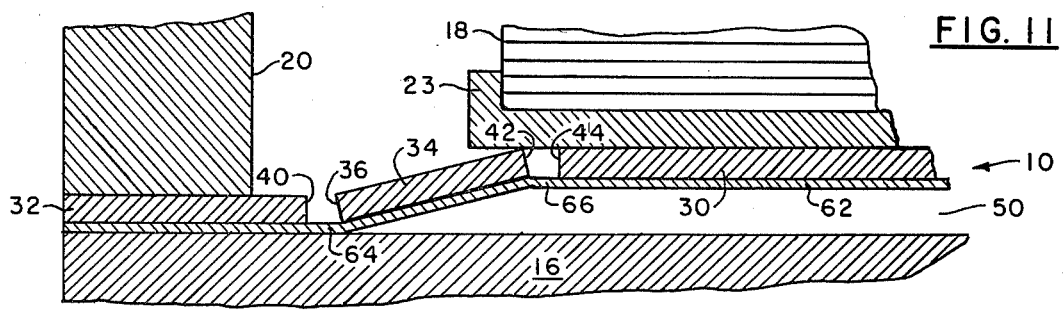

With reference to FIG. 11, the diaphragm 10 of the present invention comprises a flange engaging member 32, a frusto-conical member 34 and a central member 30 bonded to a thin flexible member 62 which is adapted to define a flexible and resilient bridge 64 in the gap between inner edge 40 of flange engaging member 32 and the outer edge 36 of frusto-conical member 34. Flexible member 62 is also adapted to define a flexible and resilient bridge 66 in the gap between inner edge 42 of frusto-conical member 34 and outer edge 44 of central member 30. Similar to the configuration of FIGS. 3 through 10, flexible member 62 is maintained in compression at bridge members 64 and 66 by the preloaded pressure of piezoelectric stack 18 on central member 30.

Figure 12:
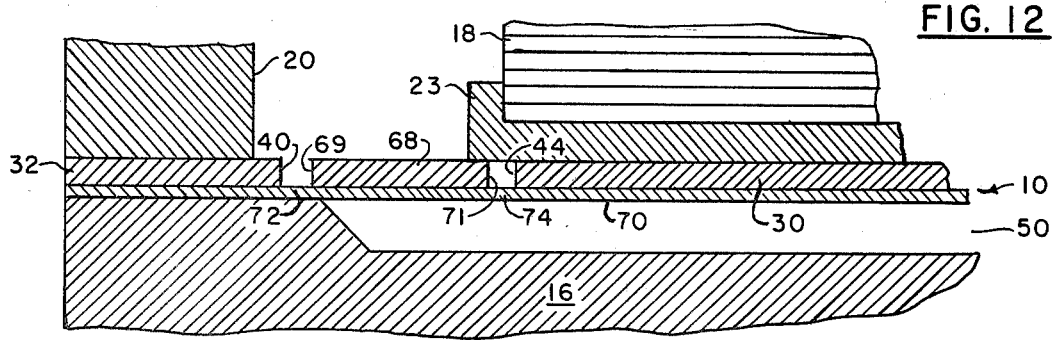

With reference to FIG. 12, a similar configuration for diaphragm 10 is illustrated in which the entire diaphragm is flat while still utilizing a flange engaging member 32, a central member 30 and a flat annular ring member 68. A thin flexible member 70 is bonded to member 32 and 68 to define a bridge 72 in the gap between inner edge 40 of flange engaging member 32 and outer edge 69 of annular ring member 68. Flexible member 70 is also adapted to define a bridge member 74 in the gap between inner edge 71 of annular ring member 68 and outer edge 44 of central member 30.

Figure 13:
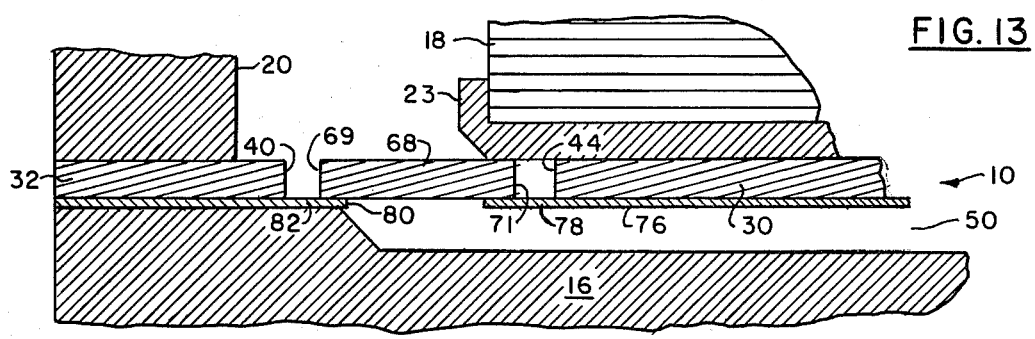

With reference to FIG. 13, members 30 and 68 are bonded to flexible member 76 to define bridge member 78 while members 32 and 68 are bonded to flexible member 80 to define bridge member 82.

Figure 14:
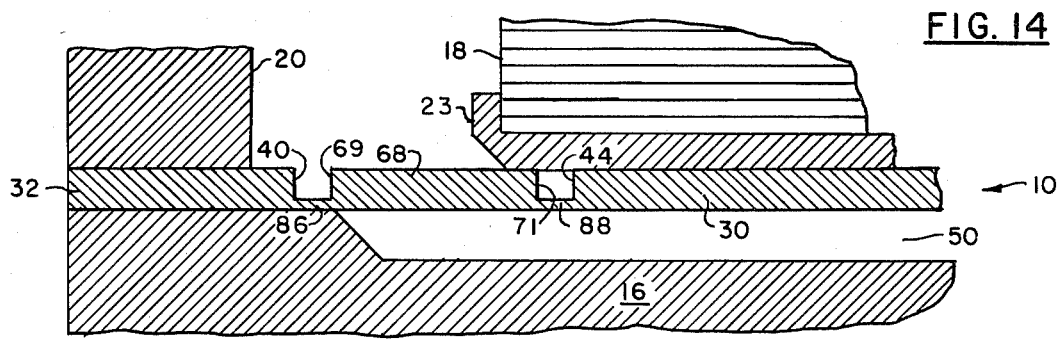

In FIG. 14, annular ring member 68 is connected to flange-engaging member 32 by thin bridge member 86. In a like manner, annular ring member 68 is connected to central member 30 by thin bridge member 88.

In order to prevent deflection of thin connecting bridge member 86 and 88 due to fluid pressure in space 50, an elastomer material 100, such as, plastic, neoprene or rubber is embedded in the remaining space between members 30, 32 and 68 next to bridges 86 and 88.

In particular, elastomer material 100 is placed between inner edge 71 of annular ring member 68 and outer edge 44 of central member 30. In a like manner, elastomer material 100 is placed between inner edge 40 of flange-engaging member 32 and outer edge 69 of annular ring member 68.

Typically, a diaphragm 10 of the present invention will be fabricated out of stainless steel with central or annular ring member 30 and frusto-conical member 34 having a thickness of approximately 0.03 inches and with a central member diameter of approximately 0.675 inches. The overall diameter of diaphragm 10 will be approximately 2.125 inches. Frusto-conical or annular ring member 34 will typically have a radial width of approximately 0.22 inches. Cavity 50 will typically have a thickness or depth of approximately 0.010 inches.

It must also be noted that the means for preloading or actuating diaphragm 10 of the present invention need not be limited to an electroexpansive drive, but may include any actuating mechanism such as an hydraulic fluid, pushrod, cam, pressurized gas or other transient force.

I claim:
1. A high pressure diaphragm comprising
   a generally planar central member having an outer edge, a low pressure side and a high pressure side,
   a generally planar outer flange-engaging member having an inner edge, a low pressure side and a high pressure side,
   a rigid, generally planar annular ring member having an outer edge, an inner edge, a low pressure side and a high pressure side,
   a first means for flexibly connecting said outer edge of said annular ring member to said inner edge of said flange-engaging member, comprising
   a first bridge member having a thickness less than the thickness of said annular ring member and fabricated integrally with said annular ring and said flange-engaging member,
   a second means for flexibly connecting said inner edge of said annular ring member to said outer edge of said central member comprising
   a second bridge member having a thickness less than the thickness of said annular ring member and fabricated integrally with said annular ring member and said central member, and,
   an electroexpansive member located proximate said low pressure side of said central member and adapted to exert force thereon when said electroexpansive member is in its expanded position, and
   means for maintaining said electroexpansive member at all times under compression.

2. The high pressure diaphragm as claimed in claim 1 wherein
   said annular ring member defines a frusto-conical ring member.

3. The high pressure diaphragm as claimed in claim 1, further comprising
   means for maintaining a compressive force on said annular ring member and said first and second means for connecting said central member to said flange-engaging member and to said annular ring member, respectively.

4. The high pressure diaphragm as claimed in claim 3 wherein said means for maintaining a compressive force on said annular ring member comprises
   means for moving said central member adapted to engage said low pressure side of said central member, and
   means for applying a force through said means for moving said central member to said annular ring member when said means for moving said central member is in its fully retracted condition.

5. The high pressure diaphragm as claimed in claim 3 wherein said means for maintaining a compressive force on said annular ring member comprises
   an electroexpansive material adapted to engage said low pressure side of said central member, and
   means for applying a force through said electroexpansive material to said annular ring member when said electroexpansive material is in its fully contracted condition.

6. The high pressure diaphragm as claimed in claim 1 wherein
   said first bridge member is located proximate the low pressure side of said annular ring member.

7. The high pressure diaphragm as claimed in claim 1 wherein
   said second bridge member is located proximate the low pressure side of said annular ring member.

8. The high pressure diaphragm as claimed in claim 1 wherein said first bridge member further comprises a curvalinear radial cross-section.

9. The high pressure diaphragm as claimed in claim 1 wherein said second bridge member further comprises a curvalinear radial cross-section.

10. The high pressure diaphragm as claimed in claim 1 further comprising
    a resilient material disposed on said first bridge member and filling the space between said annular ring member and said flange-engaging member, and
    a resilient material disposed on said second bridge member and filling the space between said annular ring member and said central member.

11. A high pressure diaphragm comprising
    a generally planar central member having an outer edge, a low pressure side and a high pressure side,
    a generally planar outer flange-engaging member having an inner edge, a low pressure side and a high pressure side, a rigid, generally planar annular ring member having an outer edge, an inner edge, a low pressure side and a high pressure side, having its inner edge adapted to be spaced apart from said outer edge of said central member, and having its outer edge adapted to be spaced apart from said inner edge of said flange-engaging member, means attached to said central member, flange-engaging member and annular ring member for flexibly connecting the outer edge of said annular ring member to said flange-engaging member, and flexibly connecting the inner edge of said annular ring member to the outer edge of said central member comprising a sheet of resilient material attached to said central member, said annular ring member and said flange-engaging member, an electroexpansive member located proximate said low pressure side of said central member and adapted to exert pressure thereon when said electroexpansive member is in its expanded position, and means for maintaining said electroexpansive member at all times under compression.

12. A high pressure diaphragm as claimed in claim 11 further comprising a resilient material disposed in and filling said space between said annular ring member and said flange-engaging member, and said annular ring member and said central member.

* * * * *